(12) United States Patent
Usami

(10) Patent No.: US 7,503,507 B2
(45) Date of Patent: Mar. 17, 2009

(54) WIRELESS IC TAG AND MANUFACTURING METHOD OF THE SAME

(75) Inventor: Mitsuo Usami, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 11/453,850

(22) Filed: Jun. 16, 2006

(65) Prior Publication Data

US 2007/0075148 A1   Apr. 5, 2007

(30) Foreign Application Priority Data

Oct. 3, 2005  (JP) .............................. 2005-289641

(51) Int. Cl.
*G06K 19/06* (2006.01)

(52) U.S. Cl. ........................ 235/492; 235/380; 235/451; 235/441

(58) Field of Classification Search ................. 235/492, 235/451, 449, 439, 441, 380
See application file for complete search history.

(56) References Cited

U.S. PATENT DOCUMENTS

2002/0074666 A1   6/2002   Usami

2005/0134460 A1   6/2005   Usami

FOREIGN PATENT DOCUMENTS

| JP | 05-150771 | 11/1991 |
|----|-----------|---------|
| JP | 09-128118 | 10/1995 |
| JP | 2000-306188 | 4/1999 |
| JP | 2001-228042 | 2/2000 |
| JP | 2003-014572 | 7/2001 |

*Primary Examiner*—Edwyn Labaze
(74) *Attorney, Agent, or Firm*—Reed Smith LLP; Juan Carlos A. Marquez, Esq.

(57) ABSTRACT

A compact wireless IC tag incorporating a pressure sensor in an IC chip. The IC chip of the wireless IC tag has SOI structure comprising a silicon sheet layer, a silicon device layer which is formed on the upper side of the silicon sheet layer, and a thin silicon oxide layer having about 0.01 μm to 5 μm thickness sandwiched between the silicon sheet layer and silicon device layer. In the silicon device layer, a capacitive element of a pressure sensor comprising of a gap, and a first metal wiring and a second metal wiring respectively disposed on the upper and lower sides of the gap, is formed. In the silicon sheet layer on the lower side of the capacitive element, an aperture filled with rubber-like elastic material is formed.

7 Claims, 12 Drawing Sheets

WIRELESS IC TAG AND MANUFACTURING METHOD OF THE SAME

CLAIM OF PRIORITY

The present application claims priority from Japanese application JP 2005-289641 filed on Oct. 3, 2005, the content of which is hereby incorporated by reference into this application.

FIELD OF THE INVENTION

The present invention relates to a wireless IC tag and a manufacturing method of the same. Particularly, it relates to a technology applicable to a wireless IC tag equipped with a pressure sensor in an IC chip of a wireless IC tag.

BACKGROUND OF THE INVENTION

JP-A No. 128118/1997 discloses a switch which transmits open/close status via wireless transmission. JP-A No. 306188/2000 discloses a sensor which detects pressure based on the change in characteristics of a bridge circuit having a resistance film, and converts the change to a digital form to be transmitted via wireless transmission. JP-A No. 014572/2003 discloses a sensor which detects pressure by a piezoelectric element, and transmits the detected pressure value via wireless transmission. JP-A No. 150771/1993 discloses a technology wherein a pressure sensor is mounted at the tip of a groove, the sensor transmits a signal representing the pressure of each finger to a wireless device via a signal line, and the wireless device transmits the signal via wireless transmission. JP-A No. 228042/2001 discloses a technology wherein a signal from a pressure sensor module is transmitted via wireless transmission.

SUMMARY OF THE INVENTION

The technique disclosed in JP-A No. 128118/1997 (patent document 1) relates to a wireless switch. The application does not mention a technique to manufacture a compact device which senses pressure, and transmits a signal representing the pressure via wireless transmission without using a battery.

The resistance film described in JP-A No. 306188/2000 is formed outside of a semiconductor chip. This application does not mention a technique to reduce the size of a semiconductor chip by forming the resistance film in the chip.

The piezo-element described in JP-A No. 014572/2003 is formed outside of a semiconductor chip. This application does not mention a technique to reduce the size of a semiconductor chip by forming a piezo-element in a chip.

The pressure sensor described in JP-A No. 150771/2003 (patent document 4) has a signal line connected to the fingertip of a groove. This configuration is not convenient, and the application does not mention a technique to reduce the size of the device.

JP-A No. 228042/2001 (patent document 5) discloses a technique to transmit an output from a pressure sensor formed by separate parts via wireless transmission. The application does not mention a technique to reduce the size of a battery-less device.

In summary, there is no teaching on a technique to manufacture compact, one-chip semiconductor chip by forming a pressure sensor inside of the chip.

The object of the invention is to provide a compact wireless IC tag which has a pressure sensor built in the IC chip.

The above and other objects and novel features of the invention will be apparent from the following description of the specification and the accompanying drawings.

Next, representative embodiments of the invention disclosed in this application will be briefly described.

According to one aspect of the invention, a wireless IC tag is provided comprising, a support sheet, an antenna formed on one surface of the support sheet, an IC chip mounted on the support sheet, and a pressure sensor built in the IC chip. The IC chip comprises SOI structure having a silicon sheet layer, a silicon device layer, and a silicon oxide layer sandwiched between the silicon sheet layer and the silicon device layer. The pressure sensor comprises a capacitive element having a pair of wirings at least one of which contacts the silicon oxide layer, a gap formed between the pair of wirings, wherein the capacitive element changes capacity of the gap when pressure is applied from outside to the IC chip.

Next, representative advantages provided by the inventions disclosed in this application will be briefly described.

By using a thin silicon oxide layer formed in an IC chip having SOI structure, slight change in pressure applied to the IC chip can be detected, so that a pressure sensor can be incorporated in an IC chip having outside dimension of 0.5 mm×0.5 mm or less.

DETAILED DESCRIPTION OF THE PREFERRED EMBODIMENTS

Next, preferred embodiments will be described with reference to the accompanying drawings. Through the several drawings, an identical reference number is assigned to an identical component in principle, and the description thereof will not be repeated.

First Embodiment

Figure 1:
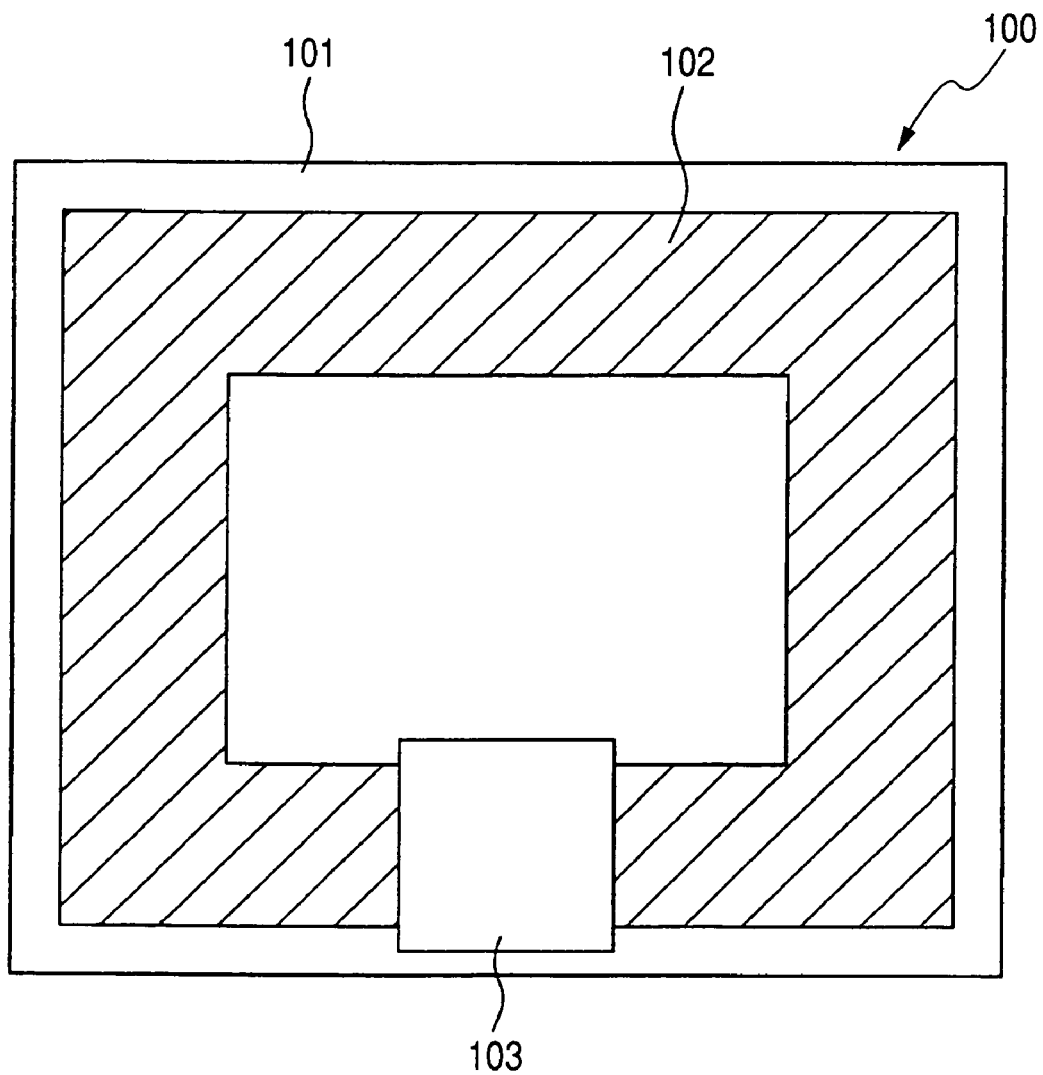
FIG. 1 is a plan view which generally illustrates a wireless IC tag according to one embodiment of the invention.
Figure 2:
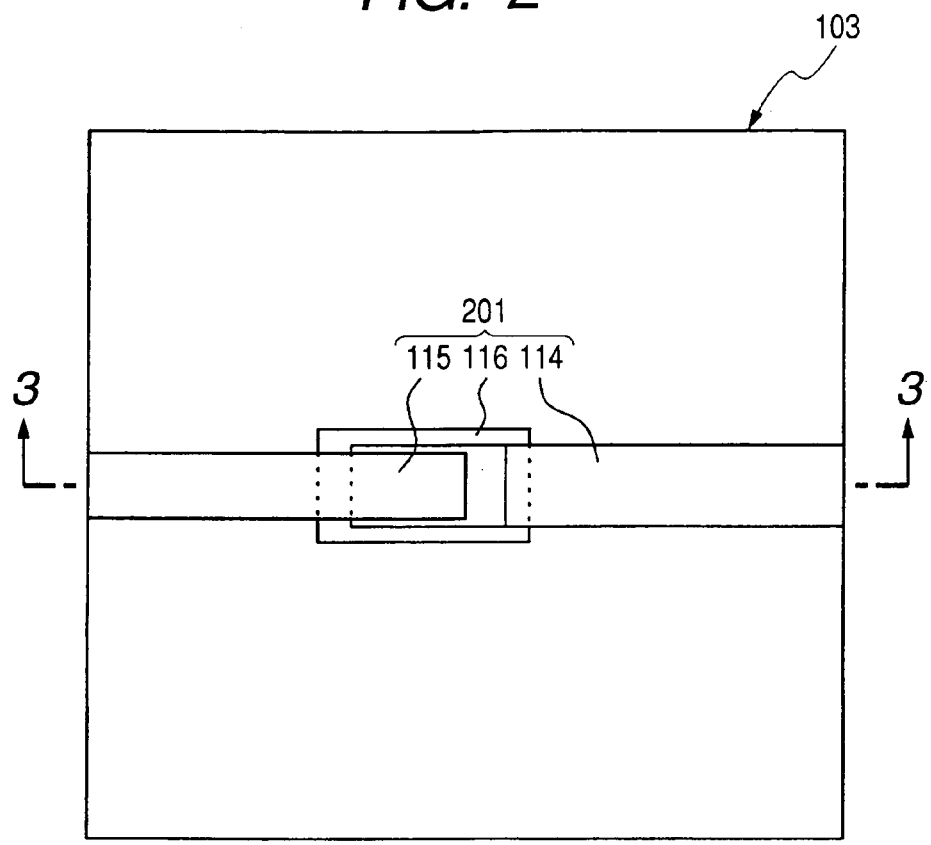
FIG. 2 is a plan view which illustrates major components of an IC chip of the wireless IC tag shown in FIG. 1.
Figure 3:
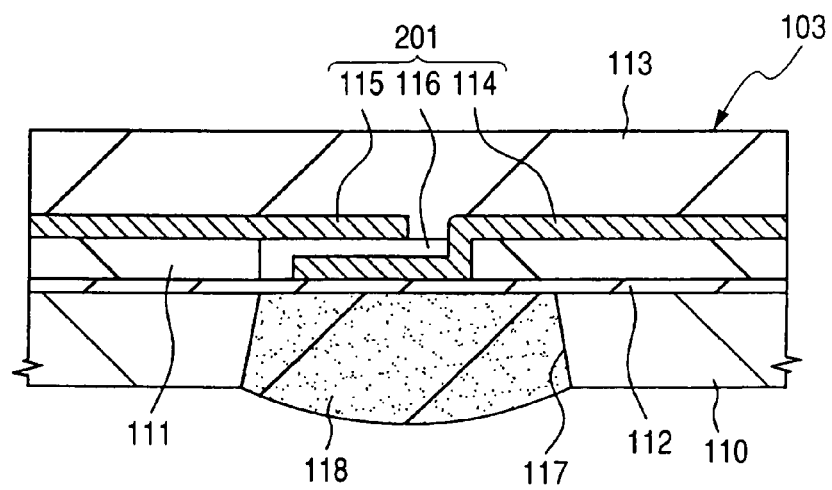
FIG. 3 is a cross-sectional view which illustrates major components of the IC chip along line A-A shown in FIG. 1.
Figure 4:
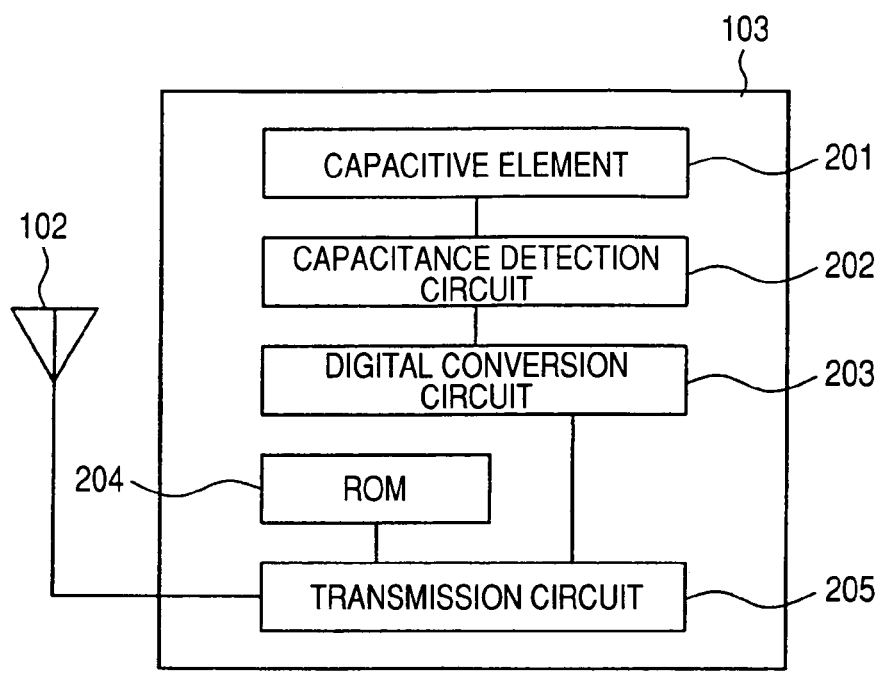
FIG. 4 is a block diagram which illustrates circuitry formed in the IC chip.

FIG. 1 is a plan view which generally shows a wireless IC tag according to an embodiment of the invention. FIG. 2 is a plan view which shows major components of the IC chip of the wireless IC tag shown in FIG. 1. FIG. 3 is a cross-sectional view which shows major components of the IC chip of the wireless IC chip along line A-A of FIG. 2. FIG. 4 is a block diagram which shows circuitry formed in the IC chip.

As shown in FIG. 1, wireless IC tag 100 comprises support sheet 101, small-sized antenna 102 formed on one surface of support sheet 101, and IC chip 103 mounted on support sheet 101. IC chip 103 comprises single crystal silicon. On the main surface thereof, capacitive element 201, capacitance detection circuit 202, digital conversion circuit 203, ROM 204, and transmission circuit 205 are formed.

In ROM 204 of IC chip 103, an identification number specific to wireless IC tag 100 is stored. The capacitance value of capacitive element 201 is detected by capacitance detection circuit 202, then converted to an analog value such as voltage, current, or frequency, then converted to a digital value by digital conversion circuit 203. The identification number stored in ROM 204 and the digitalized capacitance value are transmitted to transmission circuit 205, then transmitted by small-sized antenna 102 to outside world via wireless transmission.

As shown in FIG. 3, IC chip 103 has Silicon On Insulator (SOI) structure which comprises silicon sheet layer 110, silicon device layer 111 on the upper side of silicon sheet layer 110, and thin silicon oxide layer 112 having film thickness about 0.01 μm to 5 μm formed between silicon sheet layer 110 and silicon device layer 111. IC chip 103 having SOI structure can be formed by one of known methods to sandwich a silicon oxide film between two silicon wafers and bond them.

Although not shown in the figures, on silicon device layer 111 of IC chip 103, capacitance detection circuit 202, digital conversion circuit 203, MOS transistors which comprise ROM 204 and transmission circuit 205, and a resistance element are formed. On the upper side of silicon device layer 111, wiring layer 113 comprising a wiring which electrically connects these transistors and resistance elements, and an interlayer dielectric film, are formed. Since IC chip 103 of SOI structure can have less parasitic capacitance of the transistor compared to other type silicon chip, the spacing between transistors can be reduced, thus the chip size can be reduced to 0.5 mm×0.5 mm or less.

As shown in FIGS. 2 and 3, on silicon device layer 111 of IC chip 103, first metal wiring 114 and second metal wiring 115 are formed. First metal wiring 114 is formed in such an arrangement that a part thereof contacts silicon oxide layer 112. Second metal wiring 115 is disposed in such an arrangement that a part thereof overlaps a part of first metal wiring 114. Gap 116 is formed between first metal wiring 114 and second metal wiring 115. Thus, gap 116, and first metal wiring 114 and second metal wiring 115 on the upper and lower sides of gap 116 constitute capacitive element 201.

Aperture 117 of about 1 μm×1 μm to 300 μm×300 μm reaching silicon oxide layer 112 is formed in silicon sheet layer on the lower side of capacitive element 201. Aperture 117 is filled with rubber-like elastic material 118. Rubber-like elastic material 118 in aperture 117 serves as a medium which transfers pressure applied from outside to IC chip 103, to silicon oxide layer 112.

Particularly, when pressure is applied from outside to rubber-like elastic material 118, the pressure transfers through rubber-like elastic material 118 to silicon oxide layer 112. As mentioned above, silicon oxide layer 112 is so thin (about 0.01 μm to 5 μm) that it can readily deform by slight pressure. When silicon oxide layer 112 deforms, first metal wiring 114 which contacts silicon oxide layer 112 displaces, causing change in capacity of gap 116, and capacitance value of capacitive element 201. As mentioned above, any change in capacitance value is detected by capacitance detection circuit 202 connected to capacitive element 201, converted to a digital value by digital conversion circuit 203, then transmitted to transmission circuit 205. Thus, capacitive element 201, silicon oxide layer 112, and rubber-like elastic material 118 constitute a pressure sensor which detects pressure applied to IC chip 103. Aperture 117 filled with rubber-like elastic material 118 serves as a support to reinforce the structure of the pressure sensor.

Figure 5:
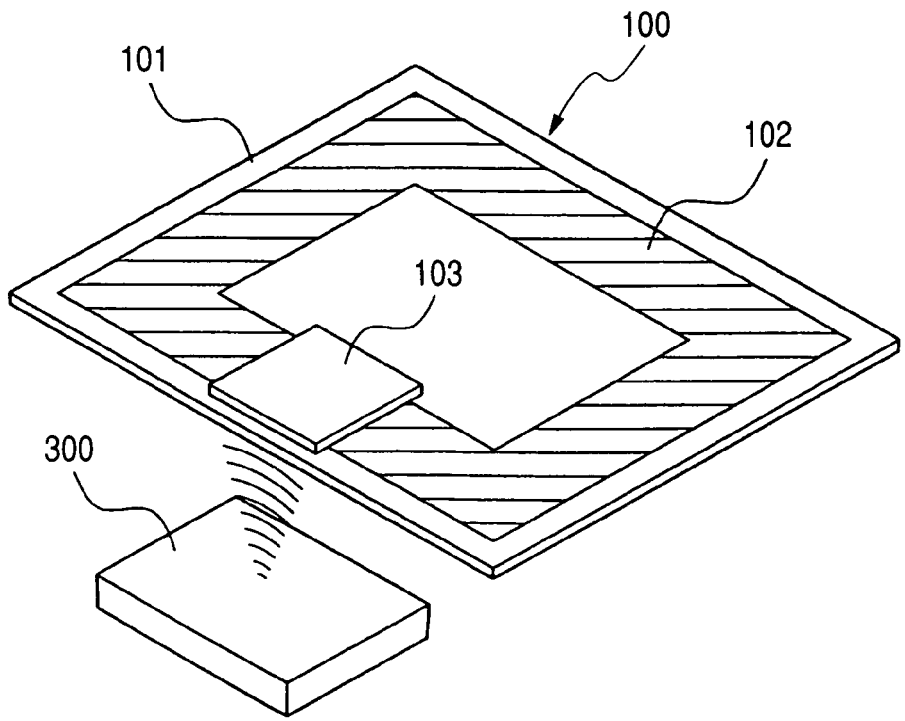
FIG. 5 is a drawing which illustrates a method to read the identification number stored in ROM of the IC chip.

As shown in FIG. 5, when reading the identification number stored in ROM 204 of IC chip 103, reader 300 is disposed close to wireless IC tag 100. In reader 300, a high dielectric ceramic antenna used in remote microwave transmission (distance from 5 m to 10 km or more, such as wireless LAN, Bluetooth, and cellular phone) is built. When electromagnetic energy is supplied to IC chip 103 of wireless IC tag 100 via the high dielectric ceramic antenna, IC chip 103 activates, and the identification number stored in ROM 204 is transmitted by small-sized antenna 102 to reader 300 via wireless transmission.

Figure 6:
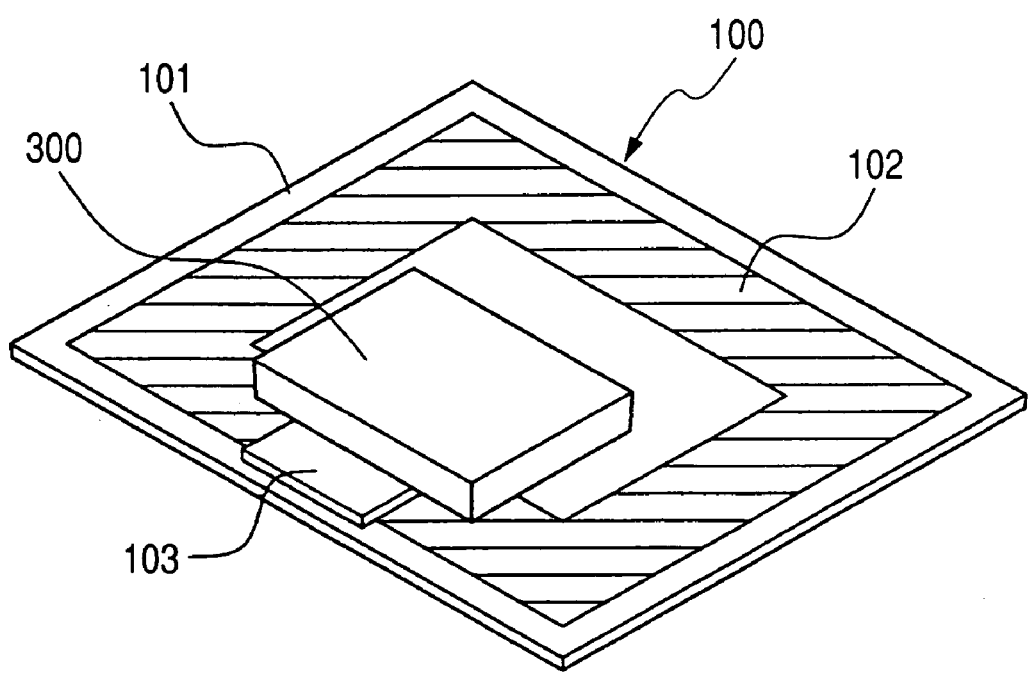
FIG. 6 is a drawing which illustrates a method to detect pressure applied to the IC chip.

On the other hand, as shown in FIG. 6, when reader 300 contacts wireless IC tag 100 and pressure is applied to rubber-like elastic material 118 of IC chip 103, the capacitance value of capacitive element 201 will change. The change in capacitance value is transmitted to transmission circuit 205 via capacitance detection circuit 202 and digital conversion circuit 203, then transmitted to reader 300 by small-sized antenna 102 via wireless transmission. Thus, the pressure value applied to IC chip 103 is read by reader 300.

Figure 7:
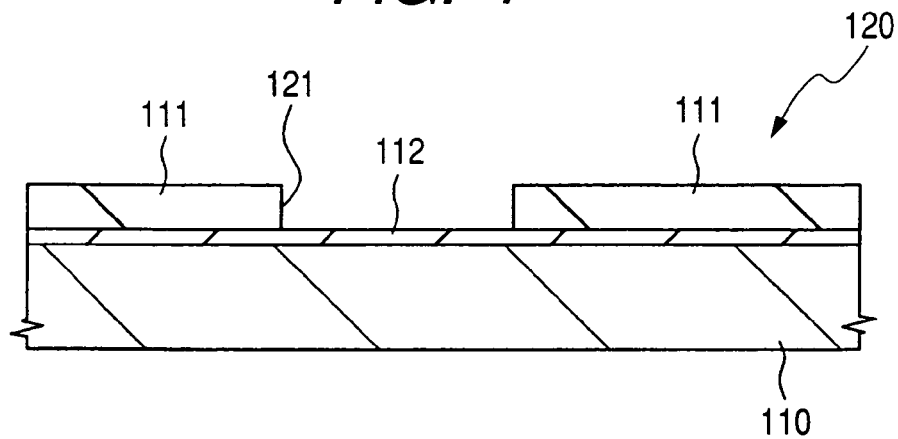
FIG. 7 is a cross-sectional view of a semiconductor wafer which illustrates a manufacturing method of the wireless IC tag according to one embodiment of the invention.
Figure 8:
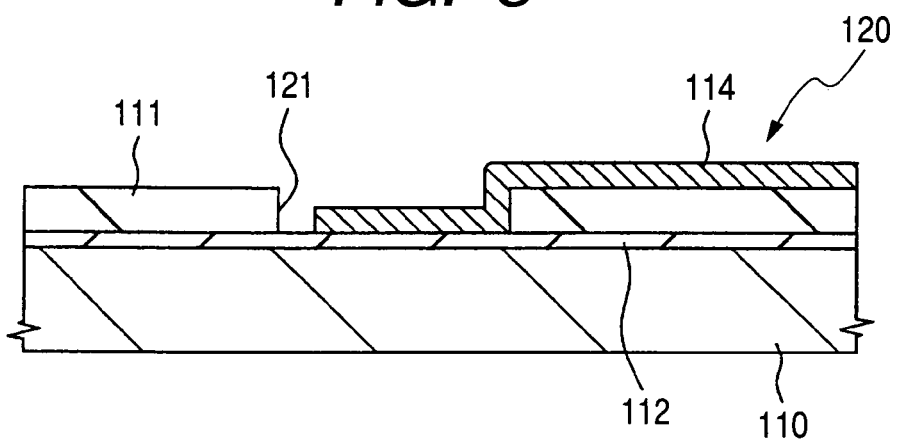
FIG. 8 is a cross-sectional view of a semiconductor wafer which illustrates the process subsequent to the process illustrated in FIG. 7, of the manufacturing method of the wireless IC tag.

A pressure sensor in IC chip 103 of wireless IC tag 100 is formed as shown in FIG. 7. Semiconductor wafer 120 having SOI structure which has silicon sheet layer 110, silicon device layer 111, and silicon oxide layer 112 sandwiched between the silicon sheet layer and the silicon device layer are provided. Next, semiconductor elements including MOS transistors and resistance elements (now shown) are formed on silicon device layer 111. A part of silicon device layer 111 is etched to form groove 121, and silicon oxide layer 112 is exposed at the bottom of groove 121.

Next, first metal wiring 114 is formed so that one end of the wiring contacts silicon oxide layer 112 at the bottom of groove 121. In order to form first metal wiring 114, a metal film made from aluminum for example is deposited on the upper side of silicon device layer 111. Then pattern is formed on the metal film using one of known photolithography techniques.

Figure 9:
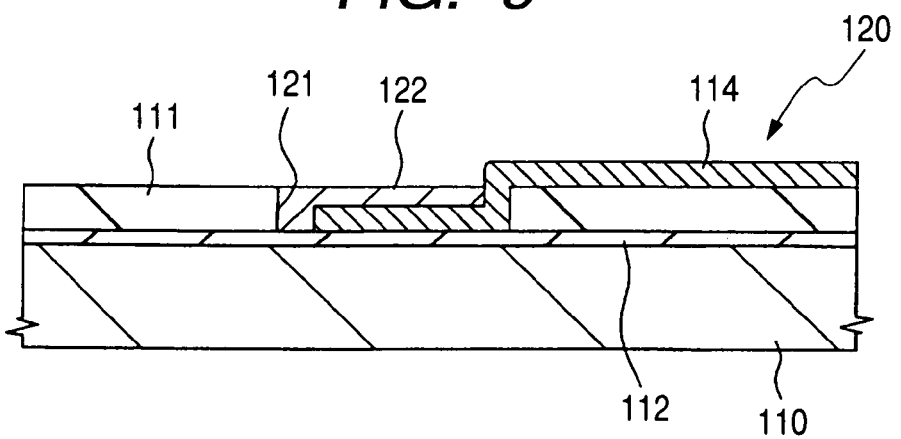
FIG. 9 is a cross-sectional view of a semiconductor wafer which illustrates the process subsequent to the process illustrated in FIG. 8, of the manufacturing method of the wireless IC tag.

Next, silicon layer 122 is embedded in groove 121, as shown in FIG. 9. In order to embed silicon layer 122 in groove 121, a polycrystal silicon film is deposited on silicon device layer 111, and the polycrystal silicon film outside of groove 121 is removed by etching, for example.

Figure 10:
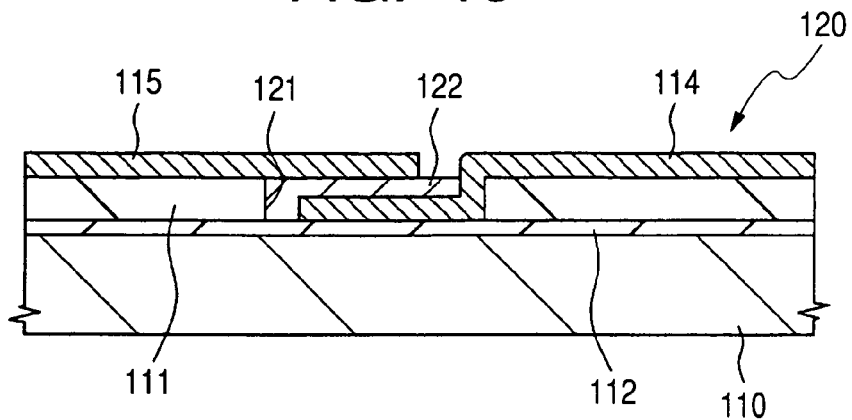
FIG. 10 is a cross-sectional view of a semiconductor wafer which illustrates the process subsequent to the process illustrated in FIG. 9, of the manufacturing method of the wireless IC tag.

Next, as shown in FIG. 10, second metal wiring 115 is formed so that one end of the wiring extends on the upper side of groove 121. In order to form second metal wiring 115, a metal film made from aluminum for example is deposited on silicon device layer 111. Then pattern is formed on the metal film using one of known photolithography techniques.

Figure 11:
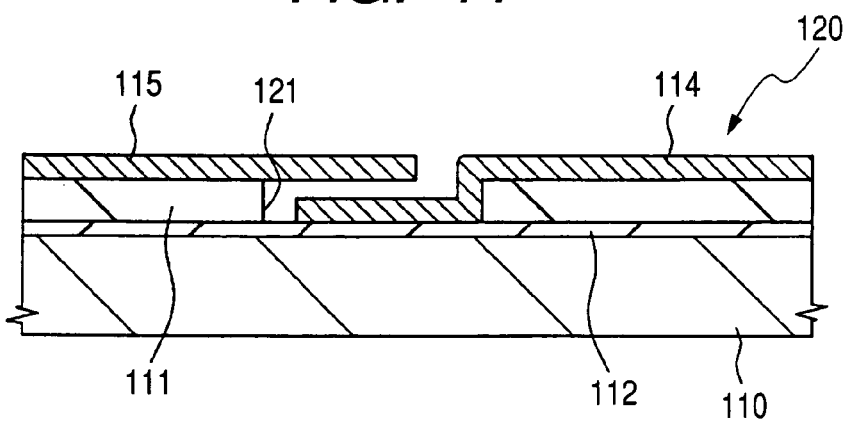
FIG. 11 is a cross-sectional view of a semiconductor wafer which illustrates the process subsequent to the process illustrated in FIG. 10, of the manufacturing method of the wireless IC tag.

Next, as shown in FIG. 11, silicon layer 122 embedded in groove 121 is removed by wet-etching. Solution of hydrazine, ammonia, or a potassium hydroxide for example, is used for wet-etching of silicon layer 122. It should be appreciated that the material to be embedded in groove 121 is not limited to polycrystal silicon film. Other dielectric material is applicable as well provided that it has sufficient etching selection ratio relative to silicon device layer 111 and silicon oxide layer.

Figure 12:
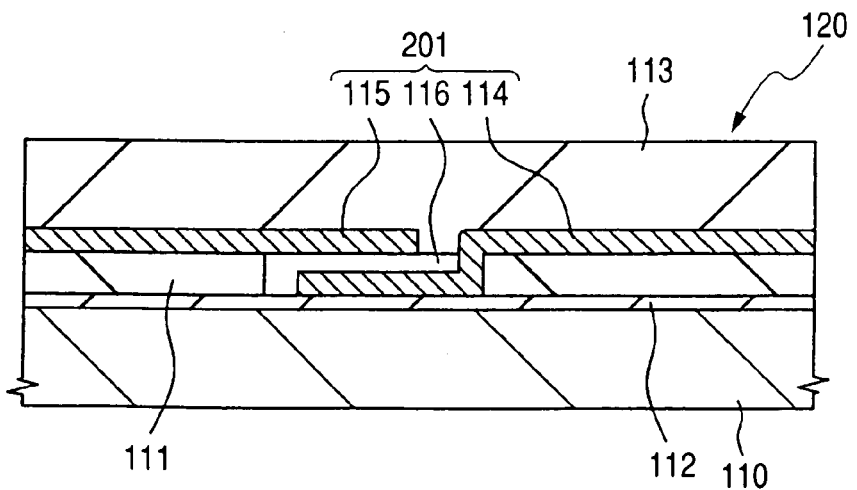
FIG. 12 is a cross-sectional view of a semiconductor wafer which illustrates the process subsequent to the process illustrated in FIG. 11, of the manufacturing method of the wireless IC tag.

Next, as shown in FIG. 12, wiring layer 113 is formed on silicon device layer 111, and gap 116 is formed in groove 121. Gap 116, and first metal wiring 114 and second metal wiring 115 disposed on the upper and lower sides of gap 116 constitute capacitive element 201. Alternatively, first metal wiring 114 and second wiring metal 115 can be formed using a process to form a wiring in wiring layer 113.

Figure 13:
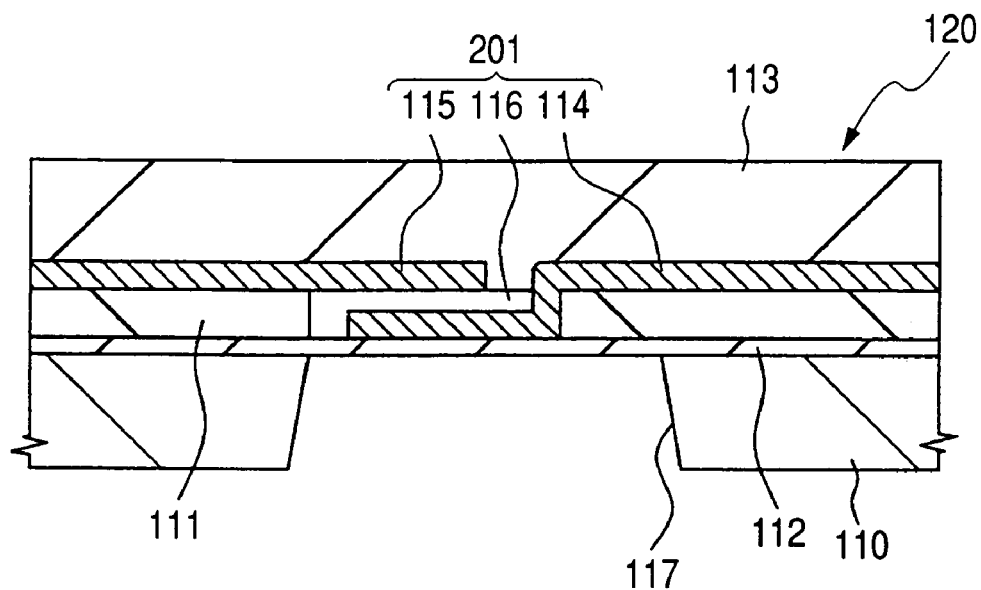
FIG. 13 is a cross-sectional view of a semiconductor wafer which illustrates the process subsequent to the process illustrated in FIG. 12, of the manufacturing method of the wireless IC tag.
Figure 14:
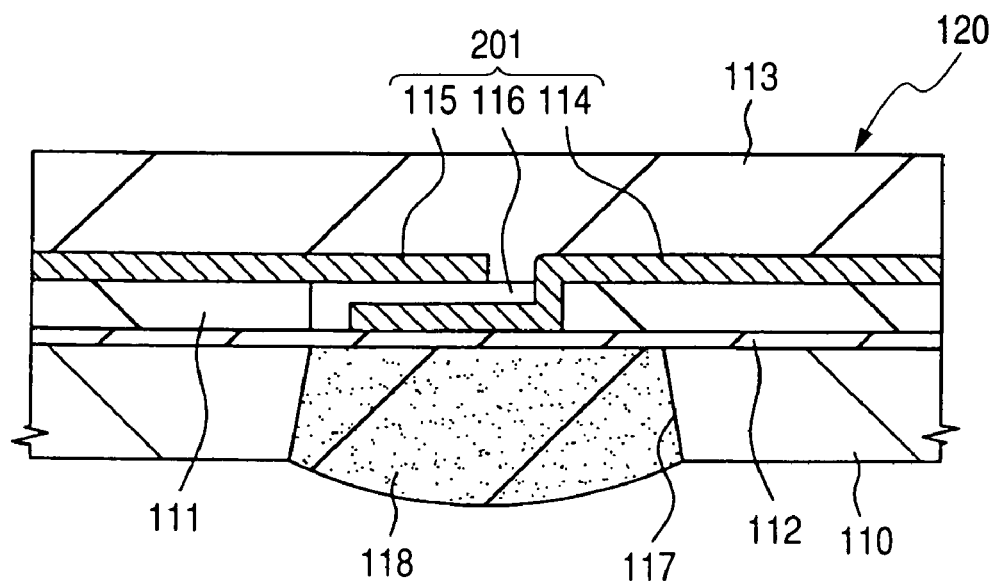
FIG. 14 is a cross-sectional view of a semiconductor wafer which illustrates the process subsequent to the process illustrated in FIG. 13, of the manufacturing method of the wireless IC tag.

Aperture 117 which reaches silicon oxide layer 112 is formed by etching silicon sheet layer 110, as shown in FIG. 13. Rubber-like elastic material 118 fills aperture 117, as shown in FIG. 14. The material to fill aperture 117 is not limited to rubber-like elastic material 118, provided that the material can serve as a medium to transfer pressure applied from outside to IC chip 103, to silicon oxide layer 112.

As described above, according to the embodiment, a small and high-sensitive pressure sensor can be incorporated in wireless IC tag 100.

Second Embodiment

Figure 15:
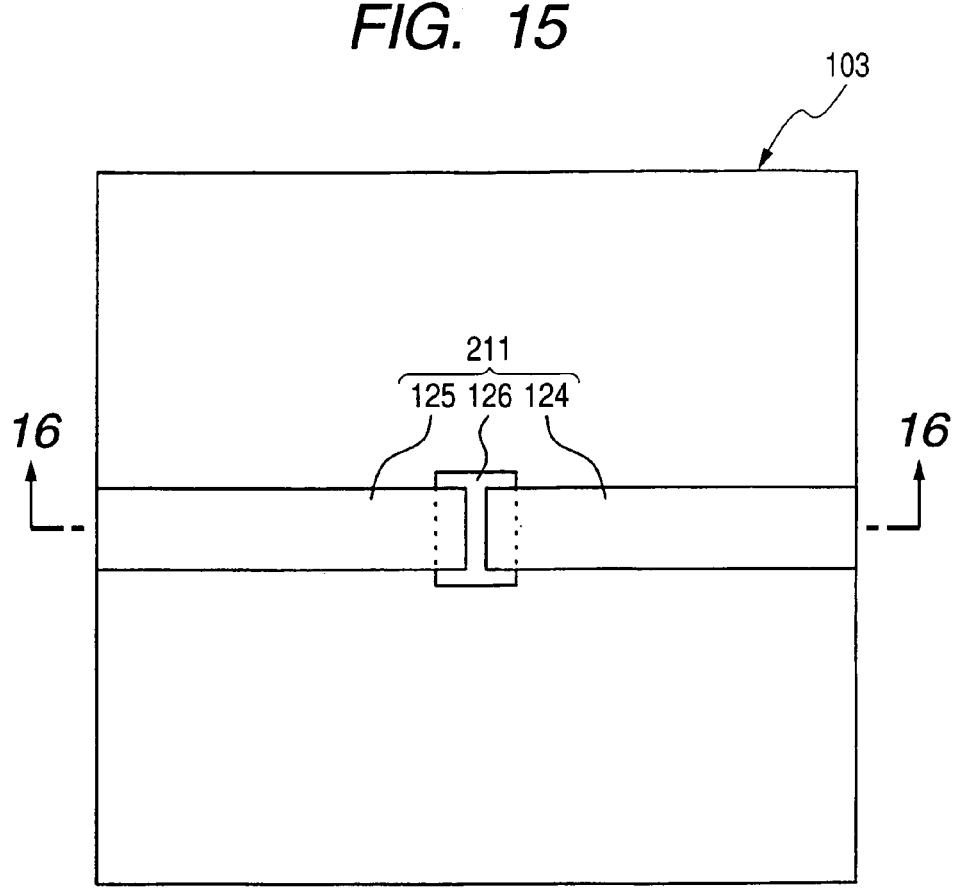
FIG. 15 is a plan view which illustrates major components of an IC chip mounted on a wireless IC tag according to another embodiment of the invention.
Figure 16:
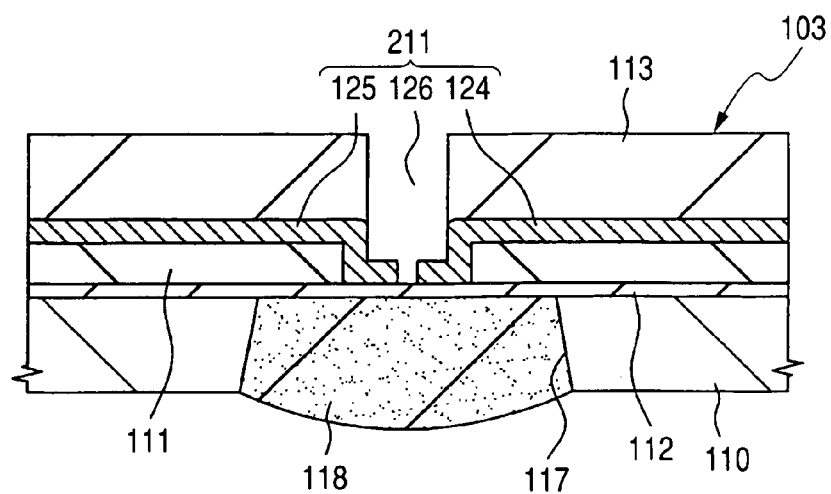
FIG. 16 is a cross-sectional view which illustrates major components of the IC chip along line B-B shown in FIG. 15.

FIG. 15 is a plan view which illustrates major component of IC chip mounted on the wireless IC tag according to the second embodiment. FIG. 16 is a cross-sectional view which illustrates major components of IC chip along B-B line in FIG. 15.

On silicon device layer 111 of IC chip 103, first metal wiring 124 and second metal wiring 125 are formed. First metal wiring 124 and second metal wiring 125 are disposed on opposite sides, and a part of both wirings respectively contacts silicon oxide layer 112. Gap 126 is formed between first metal wiring 124 and second metal wiring 125. This gap 126, first metal wiring 124, and second metal wiring 125 collectively form capacitive element 211.

Aperture 117 about 1 μm×1 μm to 300 μm×300 μm that reaches oxide silicon layer 112 is formed on silicon sheet layer 110 on the lower side of capacitive element 211. Aperture 117 is filled with rubber-like elastic material 118 which transfer pressure applied from outside to IC chip 103, to silicon oxide layer 112.

When pressure is applied from outside to rubber-like elastic material 118, the pressure transfers through rubber-like elastic material 118 to reach silicon oxide layer 112. As mentioned above, the film thickness of silicon oxide layer 112 is so thin that slight pressure can deform silicon oxide layer 112. When silicon oxide layer 112 deforms, first metal wiring 124 and second metal wiring 125 which contact silicon oxide layer 112 displace, causing change in capacity of gap 126, and capacitance value of capacitive element 211. Thus, capacitive element 211, silicon oxide layer 112, and rubber-like elastic material 118 collectively constitute a pressure sensor which detects pressure applied to IC chip 103. Other structure of IC chip 103 is similar to that of first embodiment.

Figure 17:
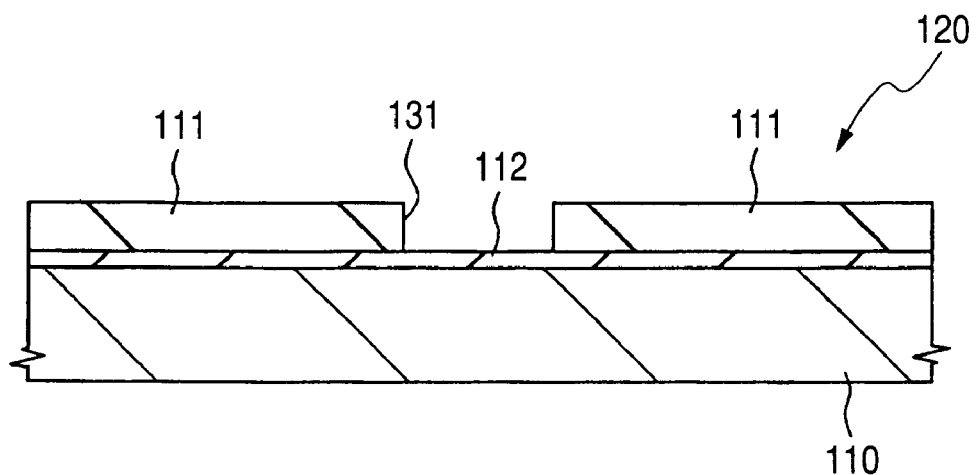
FIG. 17 is a cross-sectional view of a semiconductor wafer which illustrates a manufacturing method of a wireless IC tag according to another embodiment of the invention.

A pressure sensor of this embodiment is formed as follows. As shown in FIG. 17, semiconductor elements including MOS transistors and resistance elements (not shown) are formed on silicon device layer 111 of semiconductor wafer 120 having SOI structure. A part of silicon device layer 111 is etched to form groove 131, and silicon oxide layer 112 is exposed at the bottom of groove 131.

Figure 18:
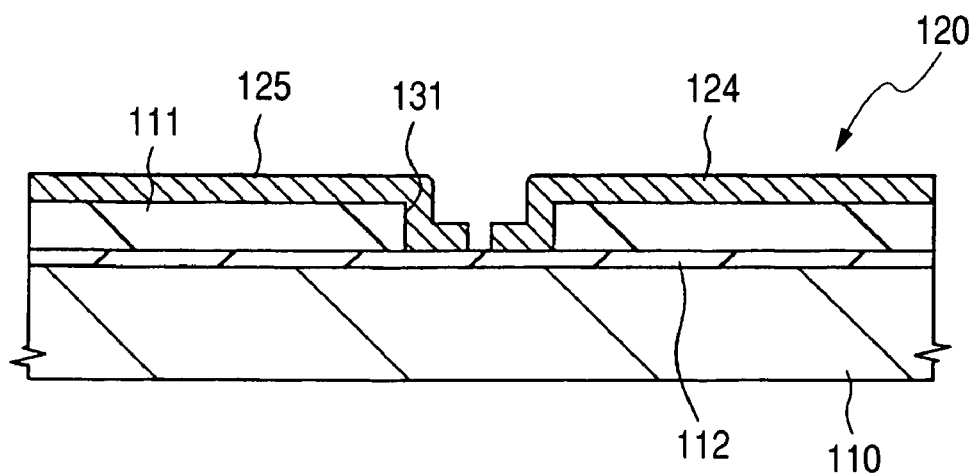
FIG. 18 is a cross-sectional view of a semiconductor wafer which illustrates the process subsequent to the process illustrated in FIG. 17, of the manufacturing method of the wireless IC tag.

Next, first metal wiring 124 and second metal wiring 125 are formed on opposite sides as shown in FIG. 18. One end of each wiring contacts silicon oxide layer 112 at the bottom of groove 131. In order to form first metal wiring 124 and second metal wiring 125, metal film made from aluminum for example is deposited on the upper side of silicon device layer 111, then patterns are formed on the metal film using one of known photolithography techniques.

Figure 19:
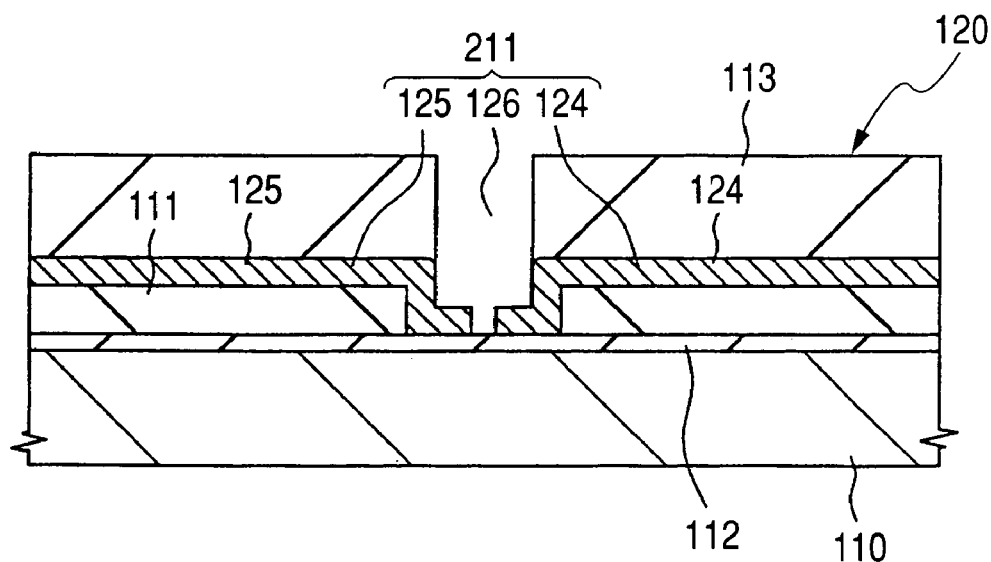
FIG. 19 is a cross-sectional view of a semiconductor wafer which illustrates the process subsequent to the process illustrated in FIG. 18, of the manufacturing method of wireless IC tag.

Next, as shown in FIG. 19, wiring layer 113 is formed on the upper side of silicon device layer 111, and wiring 113 is etched to form gap 126. Gap 126, and first metal wiring 124 and second metal wiring 125 disposed on both sides of gap 126 collectively form capacitive element 211. Alternatively, first metal wiring 124 and second metal wiring 125 can be formed using a process to form the wiring on wiring layer 113.

Figure 20:
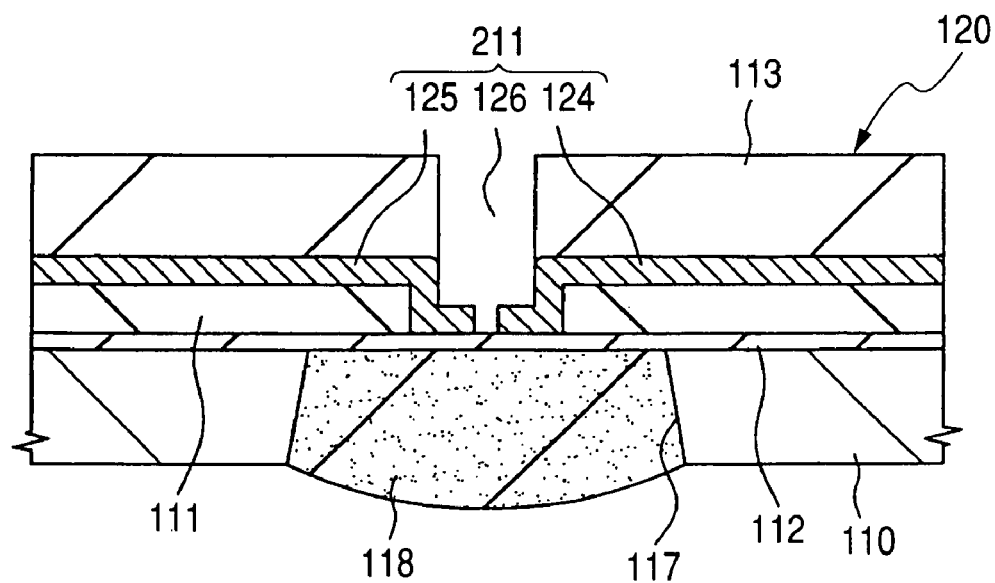
FIG. 20 is a cross-sectional view of a semiconductor wafer which illustrates the process subsequent to the process illustrated in FIG. 19, of the manufacturing method of the wireless IC tag.

Next, silicon sheet layer 110 is etched to form aperture 117 which reaches silicon oxide layer 112, and rubber-like elastic material 118 fills aperture 117, as shown in FIG. 20.

As described, according to the embodiment of the invention, a compact and high sensitive pressure sensor can be incorporated in wireless IC tag 100.

Third Embodiment

Figure 21:
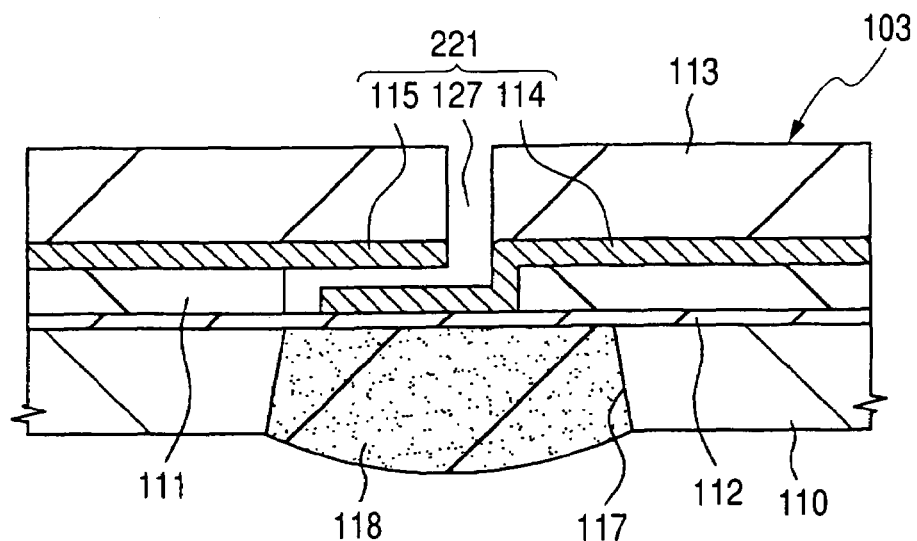
FIG. 21 is a cross-sectional view which illustrates major components of an IC chip mounted on a wireless IC tag according to another embodiment of the invention.

FIG. 21 is a cross-sectional view which illustrates major components of the IC chip mounted on the wireless IC tag according to the third embodiment.

First metal wiring 114 and second metal wiring 115 are formed on silicon device layer 111 of IC chip 103. Similar to the first embodiment, a part of first metal wiring 114 contacts silicon oxide layer 112, and a part of second metal wiring 115 contacts a part of first metal wiring 114.

Gap 127 is formed between first metal wiring 114 and second metal wiring 115. Gap 127, first metal wiring 114, and second metal wiring 115 collectively form capacitive element 221. Similar to the second embodiment, gap 127 is formed through silicon device layer 111 and wiring layer 113 on the upper side of silicon device layer 111.

In capacitive element 221, the area where first metal wiring 114 and second metal wiring 115 overlap is larger than that area in capacitive element 201 of the first embodiment and that area in capacitive element 211 of the second embodiment. Thus, capacitive element 221 can have larger capacitance value. Furthermore, the capacity of gap 127 is also large so that the change in the capacitance value caused by change in pressure can be increased. The capacitive element 221 can be manufactured according to a method similar to that for the capacitive element 201 of the first embodiment and capacitive element 211 for the second embodiment.

Forth Embodiment

Figure 22:
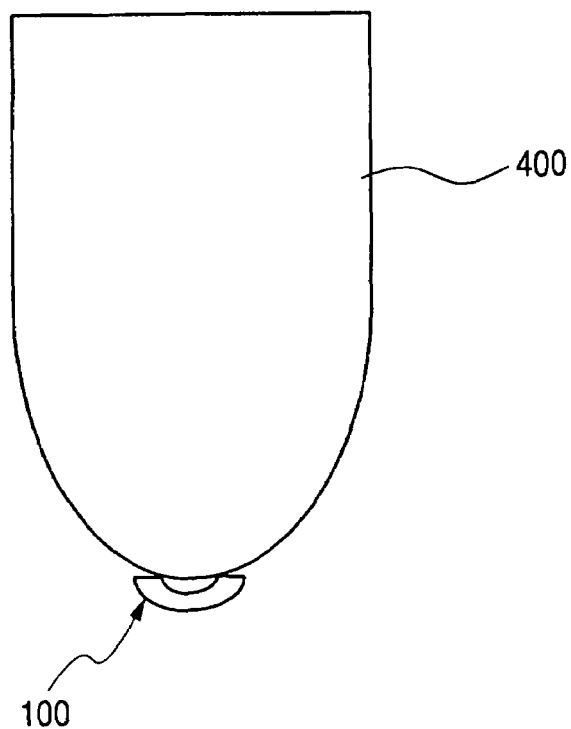
FIG. 22 is a drawing which illustrates an application of the wireless IC tag according to the invention.

FIG. 22 is a drawing which illustrates one application of wireless IC tag 100. In this example, wireless IC tag 100 is attached to fingertip of a man 400.

For example, wireless IC tag 100 can be attached to each of ten fingers of a person, and the person strikes a key of an instrument. On the key of the instrument, reader 300 is attached as shown in FIG. 6. Wireless IC tag 100 on the fingertip activates by the electromagnetic energy transferred from reader 300 attached to a key, and sends the identification number of ROM 204 and pressure value detected by the pressure sensor. Thus, the pressure of the finger striking the key can be detected.

Fifth Embodiment

Figure 23:
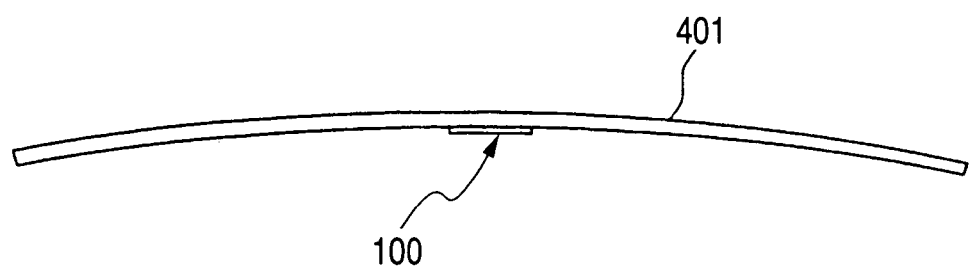
FIG. 23 is a drawing which illustrates another application of the wireless IC tag according to the invention.

FIG. 23 is a drawing which illustrates other application of wireless IC tag 100. In this example, wireless IC tag 100 is attached to flexible medium 401.

When wireless IC tag 100 is attached to a part of flexible medium 401 and medium 401 deflects by pressure applied thereto, the capacitance value of capacitive element 201 built in IC chip 103 will change. By transmitting this change in capacitance value to reader 300, the magnitude of the external pressure and the deflection of medium 401 can be detected.

Sixth Embodiment

Figure 24:
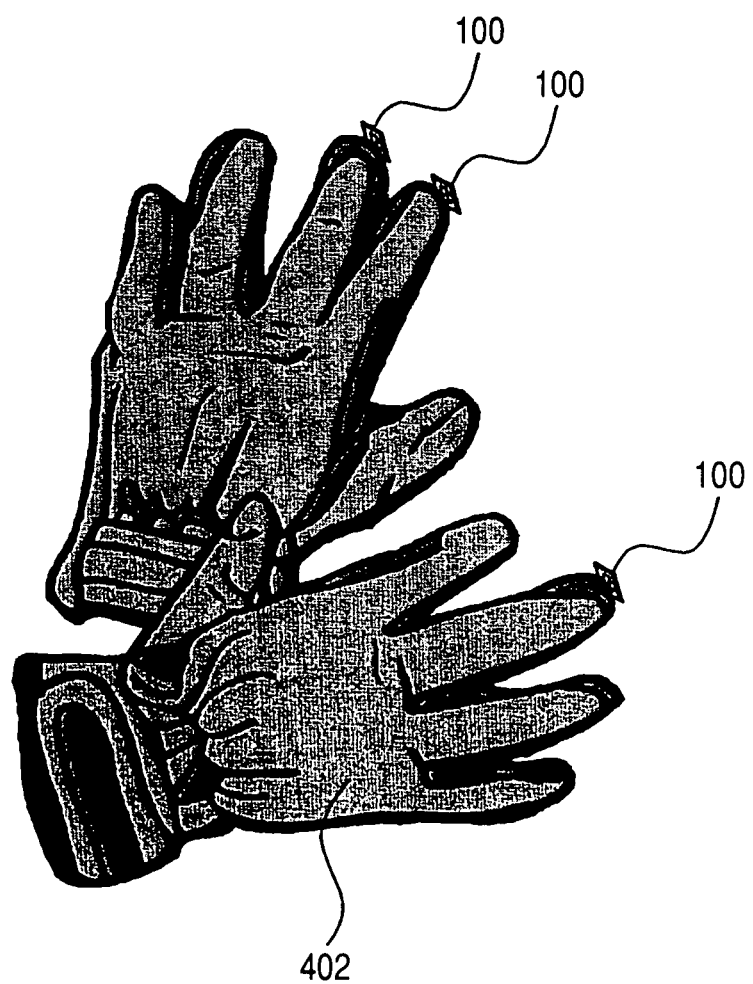
FIG. 24 is a drawing which illustrates another application of the wireless IC tag according to the invention.

FIG. 24 is a drawing which illustrates another application of wireless IC tag 100. In this example, wireless IC tag 100 is attached to a fingertip of glove 402.

Wireless IC tag 100 attached to the fingertip of glove 402 has specific identification number and a pressure sensor. When a finger wearing this glove 402 touches to an object in which reader 300 is incorporated, the reader can read the pressure applied by the finger to the object. This configuration can find application in field of game, music, and medical field such as dementia prevention training, and rehabilitation training.

The invention by the inventor has been described with reference to specific embodiments thereof. It should be appreciated that the invention is not limited to the embodiment thus described, but various alterations and substitutions can be made on the invention without departing from the true spirit of the invention, and that these alterations and substitutions are also covered by the claims as set forth herein.

The invention is applicable to a compact wireless IC tag equipped with a pressure sensor.

What is claimed is:

1. A wireless IC tag comprising an IC chip,
   wherein the IC chip has a SOI structure comprising a silicon sheet layer, a silicon device layer, and a silicon oxide layer formed between the silicon sheet layer and the silicon device layer, and comprises a capacitance detection circuit, a digital conversion circuit, a transmission circuit formed on the silicon device layer, and a capacitive element formed between a wiring layer and a rubber-like elastic material,
   wherein the capacitive element comprises a pair of wirings at least one of which contacts the silicon oxide layer, and a gap formed between the pair of wirings,
   wherein an aperture which reaches the silicon oxide layer is formed on the silicon sheet layer on a lower side of the capacitive element and filled with the rubber-like elastic material bulging from a surface of the silicon sheet layer, and
   wherein a change in a capacitance value of the capacitive element is detected by the capacitance detection circuit connected to the capacitive element, the detected change in the capacitance value is converted to a digital value by the digital conversion circuit, and the digital value is transmitted from the transmission circuit to outside.

2. A wireless IC tag of claim 1, wherein a ROM which stores identification number specific to the wireless IC tag is formed in the silicon device layer of the IC chip.

3. A wireless IC tag comprising an IC chip,
   wherein the IC chip has a SOI structure comprising a silicon sheet layer, a silicon device layer, and a silicon oxide layer formed between the silicon sheet layer and the silicon device layer, and comprises a capacitance detection circuit, a digital conversion circuit, a transmission circuit formed on the silicon device layer, and a capacitive element formed between a wiring layer and rubber-like elastic material,
   wherein the capacitive element comprises a pair of wirings which contacts the silicon oxide layer, and a gap formed between the pair of wirings,
   wherein an aperture which reaches the silicon oxide layer is formed on the silicon sheet layer on a lower side of the capacitive element and filled with the rubber-like elastic material bulging from a surface of the silicon sheet layer, and
   wherein when an object touches the rubber-like elastic material, a change in a capacitance value of the capacitive element is detected by the capacitance detection circuit connected to the capacitive element, the detected change in the capacitance value is converted to a digital value by the digital conversion circuit, and the digital value is transmitted from the transmission circuit to outside.

4. A wireless IC tag of claim 3, wherein the outer dimension of the IC chip is 0.5 mm×0.5 mm or less.

5. A wireless IC tag of the claim 3, wherein the aperture that reaches the silicon oxide layer is provided in the silicon sheet layer in neighborhood of the capacitive element, and rubber-like elastic material that transfers pressure applied from outside to the IC chip fills the aperture.

6. A manufacturing method of a wireless IC tag comprising an IC chip, wherein the IC chip has a SOI structure comprising a silicon sheet layer, a silicon device layer, and a silicon oxide layer formed between the silicon sheet layer and the silicon device layer, and comprises a capacitive element having a pair of wirings at least one of which contacts the silicon oxide layer, and a gap formed between the pair of wirings, the method comprising:

(a) etching a part of the silicon device layer so as to form a groove and expose the silicon oxide layer at the bottom of the groove;

(b) subsequent to the step (a), forming a pattern on a metal film deposited on an upper side of the silicon device layer so as to form the pair of wirings at least one of which contacts the silicon oxide layer, and the gap between the pair of wirings;

(c) subsequent to the step (b), forming a wiring layer on the pair of wirings and the gap; and (d) subsequent to the step (c), etching the silicon sheet layer on a lower side of the pair of wirings and the gap so as to form an aperture reaching the silicon sheet layer, and filling the aperture with a medium comprising rubber-like elastic material so that the medium bulges from a surface of the silicon sheet layer.

7. A manufacturing method of the wireless IC tag of claim 6, wherein the film thickness of the silicon oxide layer is 0.01 μm to 5 μm.

* * * * *